(12) United States Patent
Sutton

(10) Patent No.: US 7,041,890 B1
(45) Date of Patent: May 9, 2006

(54) ELECTRONIC SHEET MUSIC DISPLAY DEVICE

(76) Inventor: Shedrick S. Sutton, 3522 Chamberland Dr., Arlington, TX (US) 76014

( * ) Notice: Subject to any disclaimer, the term of this patent is extended or adjusted under 35 U.S.C. 154(b) by 0 days.

(21) Appl. No.: 11/143,156

(22) Filed: Jun. 2, 2005

(51) Int. Cl.
  *G09B 15/02* (2006.01)
  *G09B 15/00* (2006.01)
(52) U.S. Cl. .................. 84/477 R; 84/470 R
(58) Field of Classification Search .......... 84/477 R, 84/471 R, 470 R, 478
  See application file for complete search history.

(56) References Cited

U.S. PATENT DOCUMENTS

| | | | |
|---|---|---|---|
| D346,620 S | | 5/1994 | McSorley |
| 5,400,687 A | * | 3/1995 | Ishii .......................... 84/477 R |
| 5,665,927 A | * | 9/1997 | Taki et al. .................... 84/609 |
| 5,760,323 A | | 6/1998 | Romero |
| 6,051,769 A | | 4/2000 | Brown, Jr. |
| D428,044 S | | 7/2000 | Cullam |
| D448,401 S | | 9/2001 | Isobe |
| 6,348,648 B1 | * | 2/2002 | Connick, Jr. .............. 84/477 R |
| 2004/0040433 A1 | * | 3/2004 | Errico ....................... 84/477 R |
| 2004/0159212 A1 | * | 8/2004 | Terada ...................... 84/477 R |

* cited by examiner

*Primary Examiner*—Jeffrey W Donels
(74) *Attorney, Agent, or Firm*—Raymond M. Galasso; Galasso & Associates LP

(57) ABSTRACT

A portable electronic sheet music display device comprising a folding body having a left half body and a right half, each half having a planar rectangular configuration. The device providing for electronic transfer and display of electronic sheet music files, obtainable from many sources. The device providing dual backlit displays easily read in a wide range of lighting conditions, low power consumption high illumination, improved immunity to glare, extended operating time on solar power supplementation of battery power, ability to use readily and prolifically available PDF sheet music files from the Internet or other sources, sheet music data exchange between the display device and a users personal computer, simplicity of design, low development cost by the use of off the shelf single board low power microcomputer boards with the option to leverage the use of readily available embedded open operating systems.

13 Claims, 5 Drawing Sheets

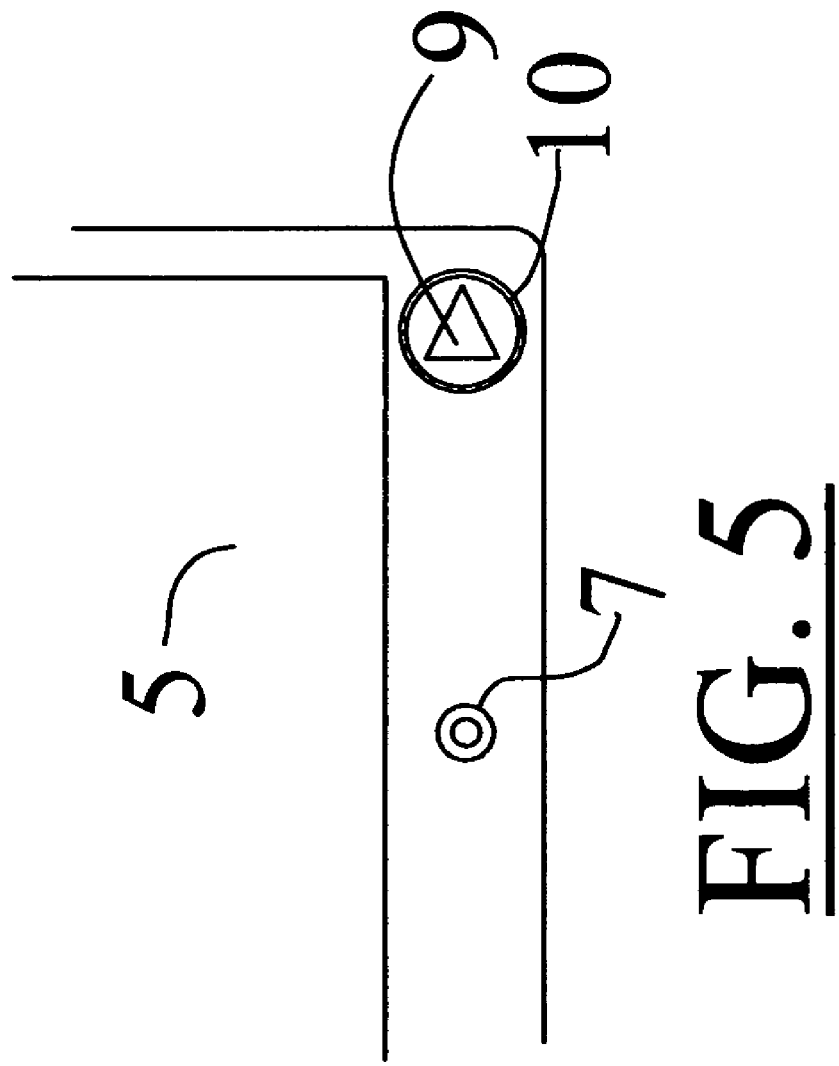

ELECTRONIC SHEET MUSIC DISPLAY DEVICE

FIELD OF THE DISCLOSURE

The disclosures made herein relate generally to the field of music display devices and more particularly pertains to a new electronic portable microprocessor based music display device that is compatible with widely available electronic sheet music files and permits a musician or student to practice or play a musical instrument score from readily available electronic copies of sheet music in a wide variety of lighting and weather environments.

BACKGROUND

As is well known, a musician may practice and often perform using sheet music as a reference to the music score to be played. For viewing, sheet music may be placed on a music stand or lyre within easy view and reach by the musician. At proper intervals as each page is played the musician may momentarily free a hand to turn to another page to continue the score or move to a new score.

As musicians know, playing from sheet music is a necessary evil. It is always better to play from memory. Many times there is not sufficient time to rehearse and memorize a score, and so the musician must play from sheet music. Playing from sheet music during a performance can be the source of many problems and distractions.

One limitation of playing from sheet music is that the ambient lighting or illumination may be too low to quickly and reliably read the music score.

Another limitation of playing from sheet music is that the ambient lighting may be too intense and positioned such as to be partially obscured by glare and shadows. This can happen, in one example, when a musician or orchestra performs outdoors.

Another limitation for the musician in performing from sheet music outdoors is the occasional rain shower, which can result in the sheet music becoming soggy and impossible to read at all. Additionally, wind gusts can cause sheet music pages to turn on its own, or worse blow completely off the stand altogether, causing the musician to get lost and the band or orchestra to sound substandard.

Therefore, a music display device that serves the musician by electronically and conveniently replaces sheet music, displays sheet music electronically in a way that is easily visible in a wide range of lighting conditions and is immune from the problems of paper sheet music would be useful and novel.

SUMMARY OF THE DISCLOSURE

Accordingly, embodiments of the inventive disclosures made herein comprise portable electronic sheet music display device.

In an electronic music display device in accordance with the present inventive disclosure, the device has a generally rectangular body comprising two halves that are joined along a separable or removable hinge. Each half provided with a face having a backlit electronic graphic display screen, for example, a liquid crystal display (LCD) screen, the screen in this disclosure engineered for high visibility in a variety of lighting levels. When the body is in a closed position the screens are in a facing coplanar relationship with each other. When the electronic music display device is in use, the halves of the body are rotated about the hinge to place the faces having the LCD displays side by side and thereby may be easily viewed by the musician.

The electronic sheet music display in accordance with the present inventive disclosure provides a separable or removable hinge to join the two display halves. Separable and removable hinges in many forms are well known. For one example, a general concept of a separable hinge applicable to the present invention is disclosed in U.S. Pat. No. 4,178,657 to Lee. Those skilled in the art will readily realize that other well known hinges can be utilized without deviating from the intention of this disclosure.

An embodiment of an electronic music display device in accordance with this inventive disclosure displays sheet music on two backlit, and preferably transflective, LCD displays. The displays are driven by a low power consumption microcomputer housed within one half of the music display device. The microcomputer is equipped to receive sheet music as Portable Document Format (.PDF) files (commonly known in the computer realm as Adobe Acrobat format). The electronic music display utilizes a version of the readily available Portable Document Format file reader or PDF reader components to decode the PDF files for display. The enclosed microcomputer is equipped to receive PDF document files via download from an external personal computer via a serial link over a USB (Universal Serial Bus) adapter cable. USB ports are well known and are commonly provided on off the shelf personal computers, making their use widely applicable and readily available for this use. Additionally, cables to connect two USB devices are readily available in stock at computer stores, electronic stores, etc.

The user can obtain sheet music in PDF format via several means, including scanning on a conventional computer connected scanner, many of which include software to write PDF files directly from scanned documents, or by purchasing sheet music in PDF format, or by downloading the sheet music in PDF format from any number of sheet music sites on the Internet, many of which offer sheet music selections for download at no charge, and some at a nominal charge. Additionally sheet music files may be exchanged between musicians from personal computer to personal computer by any number of conventional and well known computer file exchange means including email, disks and USB drives, thereby sharing music scores between all musicians performing together. Once sheet music files are downloaded to the electronic music display device, the device may be disconnected from the personal computer for ready and portable use. Electronic music display embodiments in accordance with this inventive disclosure retain downloaded sheet music internally in the internal microcomputer board in storage, such as hard disk or solid state memory devices, readily available to the musician for display and use during practice or during the performance.

With the disclosed electronic sheet music display device in use, the musician may select sheet music PDF file to be displayed from a menu providing a directory of loaded sheet music files. Once selected, the musician may advance through the sheet music a page at a time by use of a page forward button on the front of the sheet music display device, or the musician may page backwards through the selected sheet music a page at a time by use of the page backward button on the sheet music display device. One embodiment of a sheet music display device in accordance with this inventive disclosure additionally provides a foot switch for the musician. The musician may continue to play without interrupting the use of his hands by using his feet to activate a page forwards switch on the foot switch body. In one embodiment of the invention, the foot switch connects to the electronic music display device via a cable. In another embodiment of the invention, the foot switch is wireless, and communicates foot switch activations to the electronic music display device via short range wireless networking technology such as the well known Blue Tooth short range networking technology. This wireless foot switch embodiment frees the musician from possible tangling of feet in the foot switch connection cord, as it is eliminated.

The electronic sheet music display device in accordance with the present inventive disclosure is powered from a low voltage DC power source, nominally between 3 to 12 volts. The power is supplied from internal batteries, batteries which are preferably of the rechargeable variety, or alternately one-use replacement type. The electronic sheet music device may be powered from AC power by connecting its AC power adapter into an electrical outlet. Additionally, when lighting is sufficient, the electronic music display device incorporates solar cell arrays to charge the batteries or to supplement the battery power in use, thereby conserving battery power and extending the operating time As is known in the electronic liquid crystal display (LCD) art, the readability of back lit LCD displays in a bright lighting conditions is controlled by the rear polarizer and the amount of light it does or does not reflect. In a preferred embodiment, the electronic music display in accordance with the inventive disclosures herein utilizes a transflective polarizer, such that the display is easily readable in bright sunlight, as well as being back-lightable for twilight or low light conditions. In another embodiment, the electronic music display according to the disclosures herein comprises a liquid crystal graphic display having a reflective backing and utilizing a front light panel illuminated by a cold cathode florescent light (CCFL). Cold cathode florescent front light illumination of a reflective LCD can provide a brightly lit display particularly useful in bright ambient light conditions.

In an electronic music display in accordance with the present inventive disclosure, the LCD screen would preferably provide a minimum of 640×480 display dot pixel resolution for readable display of music score graphics, while higher resolution is strongly preferred. This is so that sheet music can be clearly and easily rendered. For backlighting the LCD screens in accordance with this inventive disclosure, cold cathode fluorescent lamps (CCFL) are known to provide higher light output than LED backlights, and are preferred for embodiments of the disclosed invention as by intend they need to perform well in high brightness outdoor environments. Additionally, embodiments of the electronic music display device in accordance with the present inventive disclosure are preferably provided with an anti-glare low reflective coating over the outside of the LCD glass screen, or an anti-glare film over the LCD display. In one particular example for an enabling example, one example is the LCD screen marketed by Optrex as the Optrex T-51750 6.5 inch color LCD display. This is an example, one of many available, and not intended as an 'ideal' example, but one having features suitable to the application, and offering the elements of high illumination in strong ambient light along with anti-glare properties seen as desirable in the preferred embodiment of the present inventive disclosure.

Accordingly, it is an objective of the inventive disclosures made herein to provide a novel, highly portable, low power, rugged electronic sheet music display device that replaces and eliminated the need to use paper sheet music during practice or performance.

It is another objective of the inventive disclosure made herein to provide an electronic music display device that overcomes the difficulty of reading and the uncertainty in interpreting a musical score encountered when playing from sheet music in a low illumination environment.

It is another objective of the present invention to provide an electronic music display device that displays music scores to the musician electronically using backlit LCD display technology.

It is yet another objective of the present invention to provide an electronic music display device the is weatherproof and rugged, able to withstand occasional rain showers and the bumps and mishandling of musicians setting up and tearing down before and after performances.

It is further objective of the present invention to provide an electronic music display device that is light weight and portable, that can be operated from conventional AC power or battery power.

It is a further objective of the present invention to provide an electronic music display device that is low in power consumption by intentional design, enabling extended play from batteries when required.

It is a further objective of the present invention to provide an electronic music display device that along with being low power, provides a solar cell power supplement to the enclosed batteries to extend operating time in a well lit environment, thereby providing power saving and longer use advantages to the musician.

It is another objective of the present invention to provide an electronic music display device that allows music scored pages to be advanced easily by single button press or foot operation, freeing the musician from interrupting play to turn or reposition pages.

It is another objective of the present invention to provide an electronic music display device in which music scores can be loaded from a personal computer to the music display device via a conventional high speed USB communications port, and in which music scores can be retained indefinitely for performances.

It is yet another objective of the present invention to provide, in one embodiment, an electronic music display device which may be constructed using available low power, single voltage supply single board computer technology, and that uses convenient and available embeddable operating systems such as Linux or Windows CE, with emphasis towards and benefits gained from low development and product research costs, low manufacturing cost, therefore lower development cost recovery and lower price to the user along with providing high end capabilities and value to the musician.

It is another objective of the present invention to provide an electronic music display device that is by design stingy with power consumption, thereby achieving long operating life from batteries, or solar cell supplemented battery power, in addition to the option for AC operation. Low power is achieved by design intent throughout, by the application of ultra low power CPU processors and computer boards, and by the diligent use of power reducing anti glare films applied to the display.

It is another objective of the present invention to provide an electronic music display device using ultra low power computer processor technology.

In another particular embodiment, it is an objective of the present invention to provide an electronic music display device that may be constructed with very little or no electronic hardware engineering, and very little software development. This is done by making use of the developed and available capabilities of readily available low cost, commercially available, ultra low power single board computer technology, technology which can run embedded versions of preferably open source operating systems (OS) such as Linux, and using the multitasking, networking, display, and disk IO handling capabilities of an OS such as Linux to implement upon and support the music display device computer functionality. Music score display may be handled by the use of readily available portable document format readers or reader components, such as Adobe Acrobat, on the electronic music display device. Examples of such single board, lower power low cost small size single board computers equipped with embedded versions of operating systems such as Linux or Windows CE are offered by manufacturers such as Acrosser Technlogies Co Ltd series of x386 to Pentium single board computer, and Advanced Micro Peripherals Ltd of Cambs, England. These are but enabling examples, and many other single board embedded single board computers are readily available. Single board low power computer, such as these running Linux and utilizing SD RAM or flash RAM and a flash file system disk for storage are particularly suited to this additional embodiment of the electronic music display device of this inventive disclosure.

It is another objective of the present invention to provide an electronic music display device that provides internal back lit illumination to the LCD display screens to provide illumination in low light environments. It is also an objective to provide a electronic display device having an adjustable slider dimmer to allow the back lighting level to be adjusted, and by conserving power by reducing illumination in higher lighting environments.

It is a known problem with conventional backlit LCD technologies that backlit LCDs do not perform well in strong ambient lighting, including displays used in the present art electronic music displays. This is due to a number of factors, including reflection or glare on the LCD screen front from strong ambient illumination, resulting in the fact that conventional back lit LCDs are not readable using front ambient lighting alone. This is very familiar to people who use cell phones , or PDAs in direct sunlight. While strong ambient lighting can be overcome with intense back lighting, this can be an enormous power drain trying to overcome and overpower, say, the sun's illumination. It is known that cold cathode fluorescent devices achieve higher illumination and efficiencies than light emitting diode (LED) backlight panels for LCD back lighting, but achieving sufficient illumination alone to overcome strong ambient lighting and glare without other aids can be an immense power drains and undesirable from a battery power/ life situation. It is an objective of the present invention to provide a back lit LCD technology using a transflective LCD display that works well in a range of illumination from high illumination to twilight, thereby overcoming display problems in the current art. It is another objective to provide a music display device having an LCD display that overcomes or minimizes the problems of reflection and glare as present on present art music stand and display devices using in high illumination environments by the application of an anti-glare low reflective film coating over the LCD screen. These are two significant improvements over all of the current prior art electronic music display designs.

It is another objective of the present inventive disclosure to provide an electronic music display device that utilizes two flat screen back lit LCD screens that, when open, provide a two page view of the music score, or can alternately be separated at the hinge yielding two detached screens displaying the same score page for two or more musicians.

High illumination, low power, readability over a wide range of illumination, immunity to reflected glare, transflective or front lit reflective displays for use of ambient light for screen illumination in outdoor or high lighting environments thereby reducing backlight power consumption, backlit or frontlit screens for use in low lighting, extended operating time on solar power supplementation of battery power, highly portable, ability to use readily and prolifically available PDF sheet music files from the Internet or other sources, sheet music data exchange between the display device and a users personal computer, simplicity of design, low to no development cost by the use of off the shelf single board low power microcomputer boards leveraging the use of readily available embedded open operating systems, examples of which include Linux, Windows CE, CE.net or XPe, to name a few; and by the use of the OS provided display drivers, networking components, USB drivers, file system drivers that are provided with and part of the embedded operating system, separable displays to enable one device to serve two musicians. This is a partial list of features of the subject disclosure describe a novel and useful electronic sheet music display device. All combine, as well as combine in subsets, to provide high end functionality and a patentably novel and desirable combination of features to the musician at low development cost, and provide a product which the musician can readily transport, for which a musician can easily obtain sheet music files often at no cost, immediately put to use, use anywhere, and provides novel features and capabilities above and beyond what is provided in the current electronic sheet music display device art.

These and other objects of the invention made herein will become readily apparent upon further review of the following specification and associated drawings.

BRIEF DESCRIPTION OF THE DRAWINGS

The drawings show a form of the invention that is presently preferred, however the invention is not limited to the precise arrangement shown in the drawings.

FIG. 5 is a zoom view around the page forward directional arrow on the right lower half of the sheet music display device of FIG. 1, showing the directional arrow button with the ring of light around the arrow.

DETAILED DESCRIPTION OF THE DRAWINGS

Figure 1:
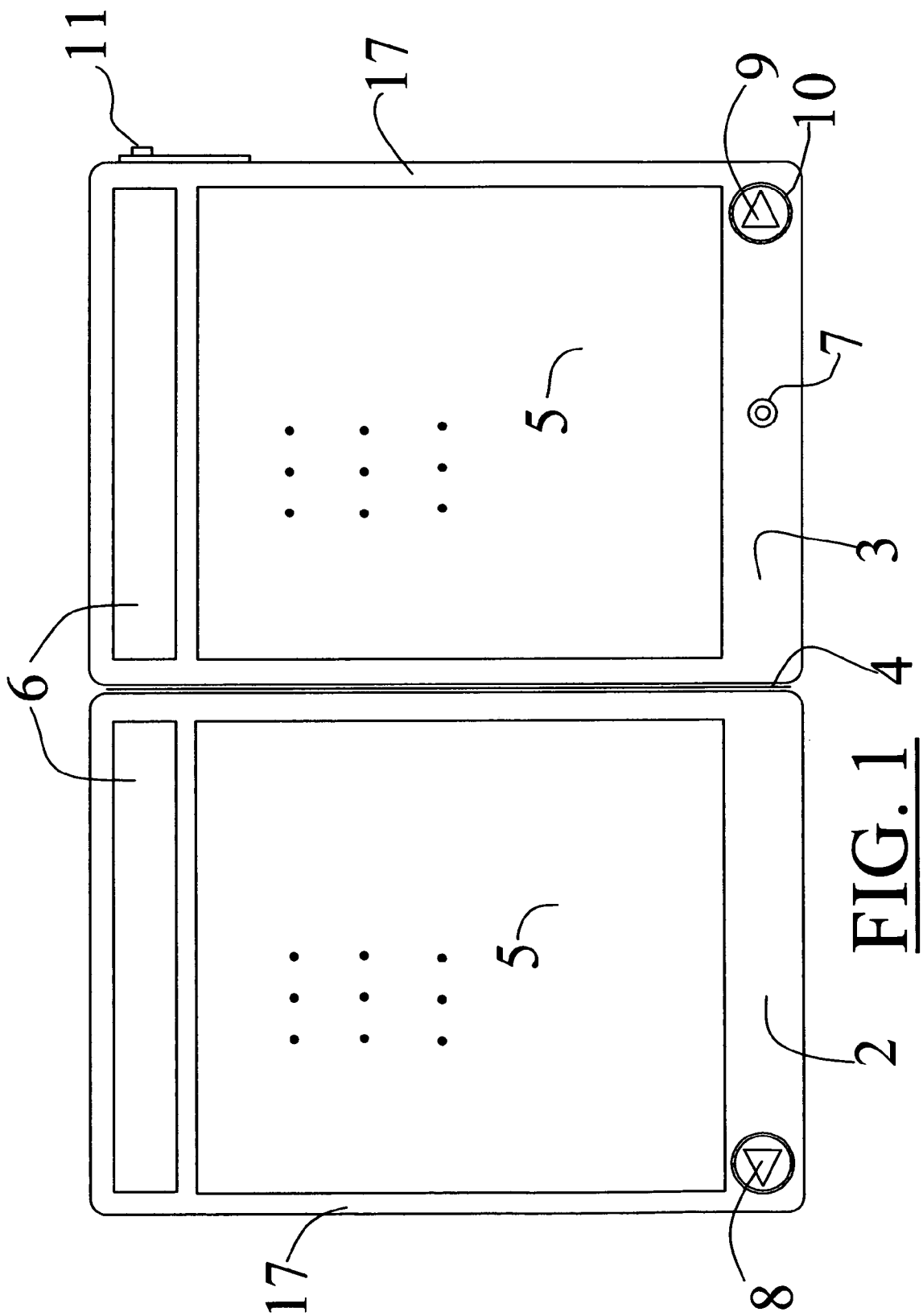
FIG. 1 is a face on view of the electronic sheet music display device in accordance with the inventive disclosures herein. The sheet music display halves are opened side by side along the separable or removable hinge.

FIG. 1 depicts an electronic sheet music display device in accordance with an embodiment of the inventive disclosures made herein. The sheet music display device comprises an electronic sheet music display device body 1, which is formed by a left half body 2, and a right half body 3, which are connected by a separable or removable hinge 4. Each half body has a front face portion 17, the face including a backlit electronic graphics display screen 5. The illumination intensity of the display screen is controllable by with the user through sliding adjustment of backlight intensity control 11, provided on a side portion of at least one sheet music display device half body. Each half body front face further includes a solar cell array for supplementing internal battery power, or charging the internal batteries. The front face portions further include directional selectors page forward 9 and page back 8, as well as a power on condition indicator light emitting diode 7.

Figure 2:
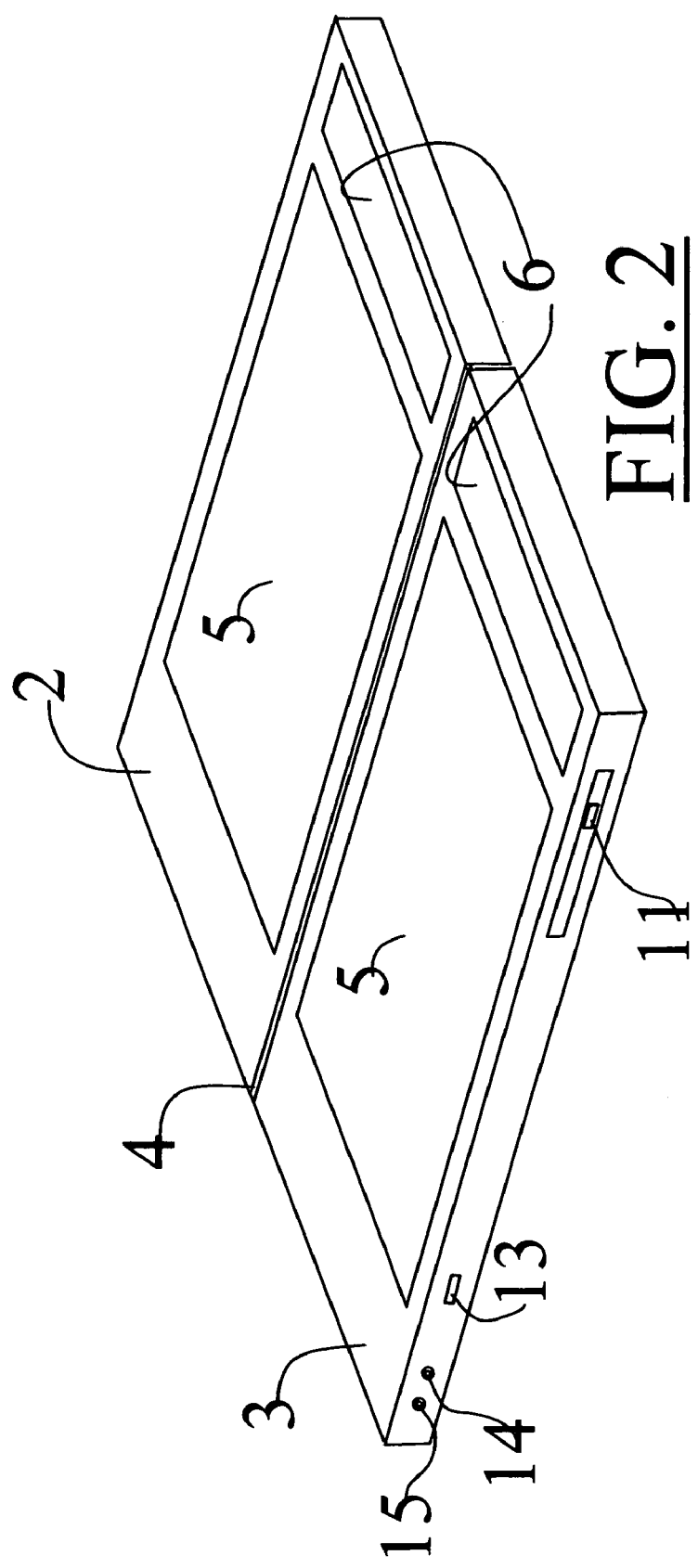
FIG. 2 is a right side view of the sheet music display device of FIG. 1, showing the display brightness control, USB and power connections.

Referring now to FIG. 2, the side portion of the right half body 3 is provides with a USB port 13, a DC power supply connection receptacle 14, a foot switch cable connection port 15, and a screen backlight intensity control 11.

Figure 3:
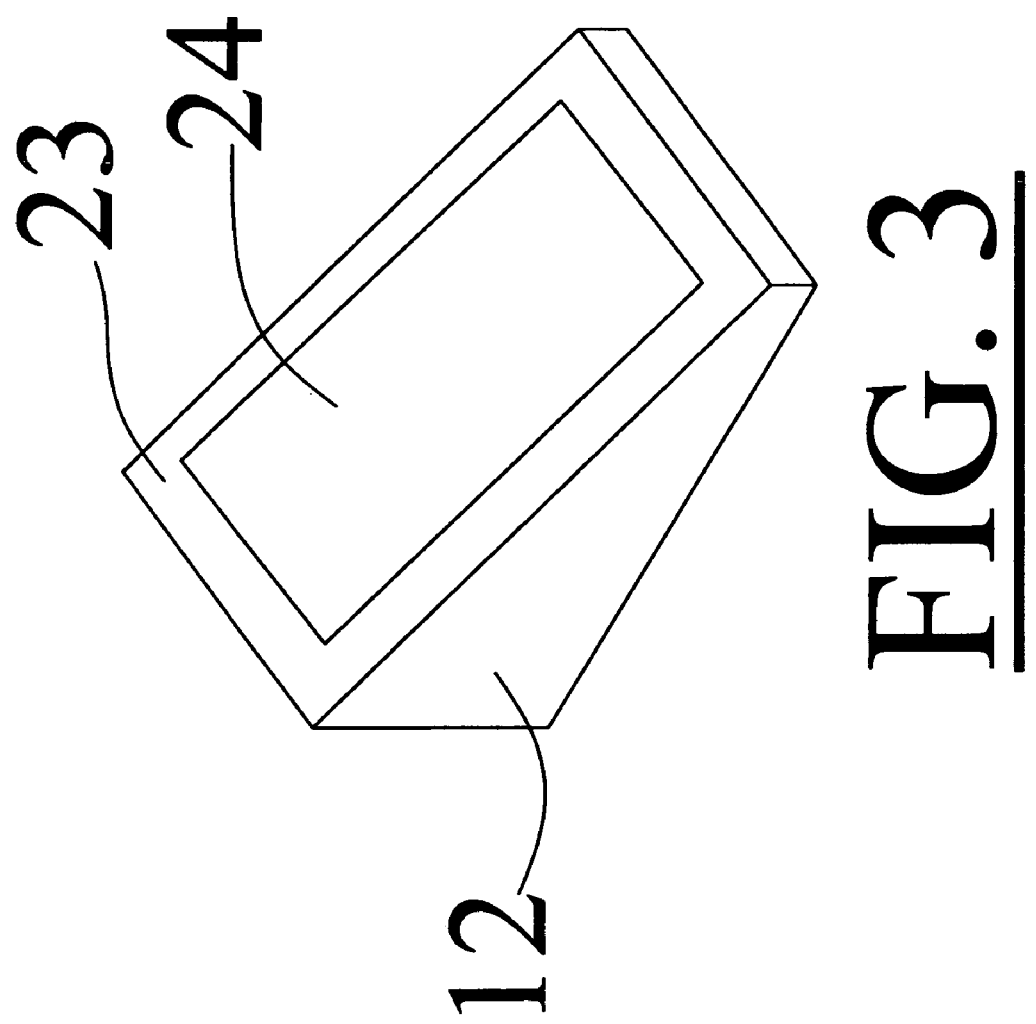
FIG. 3 is an isometric view of the foot switch display body.

FIG. 3 depicts a foot switch in accordance with the inventive disclosures made herein. The slanted front face 23, of foot switch body 12 is provided with a foot actuated switch portion 24. The switch portion provides a foot actuated momentary electronic switch closure which is communicated to the sheet music display device via an electronic cable provided with the foot switch that plugs into the foot switch cable connection port 15 of the electronic sheet music display device. The electronic music display senses the foot switch closure as a page forward selection, providing the same function as the page forward selector 9 on the electronic sheet music display device. The use of the foot switch frees the musician's hands during performance in advancing the sheet music through to the next page. In the preferred embodiment of the invention, the foot switch foot actuated switch member is a pressure sensitive membrane switch, selected to provide operation without mechanical noise as could be present in a mechanical switch operation such as used in the prior art. Membrane switch technology is well known, is commonly used on devices from microwave ovens to calculators, and is readily available is a variety of forms from many manufacturers. The membrane type foot switch provides the additional feature of a flush clean appearance to the switch.

Figure 4:
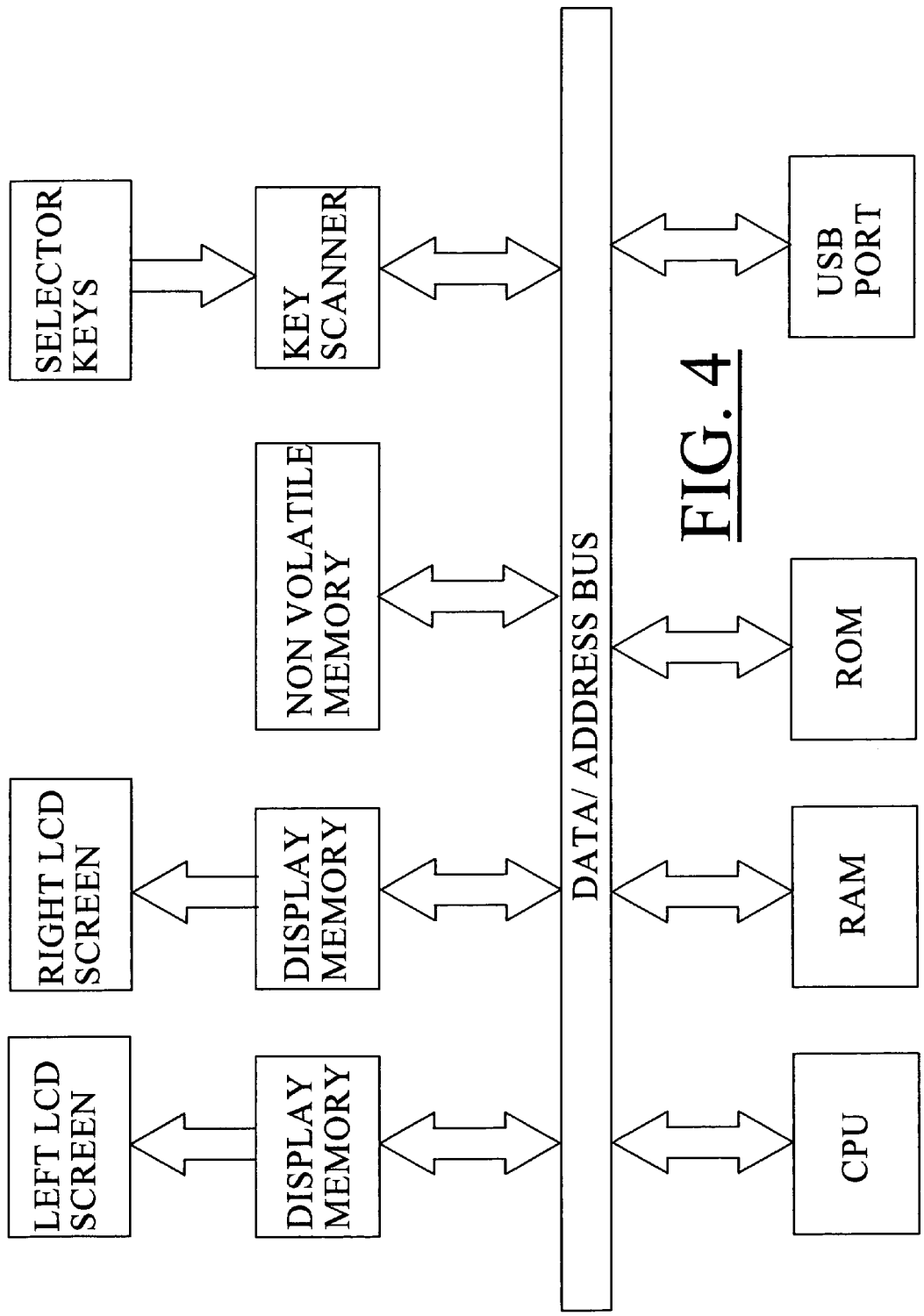
FIG. 4 is a block diagram of the microprocessor based controller and associations with major components.

FIG. 4 presents a block diagram outlining the chief functional blocks of one particular embodiment of a microprocessor based controller that may be employed to achieve the electronic music display device in accordance with the inventive disclosures presented herein. In this diagram, the left and right frame buffer display memories are mapped directly into the address range of the processor, although the invention is not limited to a memory mapped microprocessor based controller. Display memories and driver hardware drive pixels for display in the left and right LCD screen displays. The computer includes a least one form on non-volatile rewrittable memory, this might include a hard disk, or multimedia memory card (MMC) or any number of memory devices having a characteristic of retaining stored data when power is removed. Non-volatile memory stores, among other things, the download electronic sheet music files. The key scanner is depicted as mapped directly into the processor address space, although the invention is not limited to this. The key scanner could, for instance, reside on an I/O port, or key scanning could be accomplished with software and simple address decoders detecting closed key positions as a binary '1' and open keys as a 0. Keys include the selectors, such as page forward and page backwards. Scanning in the implementation shown would be done through a driver polling a set of addresses, although the invention is not limited to a polling key input decoding implementation. The random access memory (RAM) and read-only memory (ROM) are well understood terms to those skilled in the art. The RAM serve as scratchpad and working memory to the operating system and running applications, while the ROM provides storage for, among other things, the embedded operating system. The operating system can be a simple custom written set of routines to implement basic functions, or could be the embedded OS as described in detail earlier. The USB Port hardware is to provide a universal serial bus (USB) interface to a personal computer for file transfers and remote file maintenance, as discussed in detail earlier.

FIG. 5 presents a zoom view of the page forward directional arrow 9 and the ring of light 10 around the arrow. Both the page forward directional arrow selector 9 and the page back directional arrow 8 have the arrow symbol portions illuminated, and the both have an illuminated ring of light 10 around the directional arrows to aid a user in identifying and locating the buttons when the electronic sheet music display is used in a low light environment.

The electronic display screens, one provided on the face of each half body, are backlit LCD graphics display devices, similar to what is available on a personal digital assistants (PDA) and notebook computers. As discussed in detail in the earlier Summary of the Disclosure, backlighting is provided to allow use in a low lighting environment. The display for sheet music can be a page white or monochrome type display as such displays can provide higher contrast than color displays, although a color display can also be utilized to advantage. As discussed in the Summary of the Disclosure, the preferred embodiments utilize either a backlit LCD graphic displays of the transflective type, or a frontlit LCD having an reflective backing and cold cathode fluorescent (CCFL) front light illumination. At least a 640 by 480 display dot pixel resolution is utilized, higher resolution is preferred. As discussed in the Summary of the Disclosure, a preferred embodiment utilizes an LCD display includes an anti-glare low reflective coating or film present over the face of the LCD display to minimize glare, reflections and improve clarity and contrast when utilized in a strong illumination environment. An example of an LCD display having a low reflectivity coating was discussed earlier. Additionally, as discussed in the Summary of the Disclosure, the preferred embodiment utilizes a transflective LCD back reflector, as display must be readable under a wide range of lighting conditions. LCD reflectors provide an LCD display that it will utilize ambient light in the bright sunlight, but can also be illuminated at twilight and at night, allowing the display to serve the musician well over a wide range of lighting conditions.

The electronic sheet music display in accordance with the present inventive disclosure provides a separable or removable hinge 4 to join the two display halves. Separable and removable hinges are well known. An example of a suitable separable hinge applicable to the present invention is disclosed in U.S. Pat. No. 4,178,657 to Lee, many others are known. Those skilled in the art will readily realize that other well known separable hinges can be utilized without deviating from the intention of this disclosure.

For use, the electronic sheet music display must first be loaded electronic sheet music files. As discussed in the Summary of the Disclosure, such files are readily available on the Internet from a variety of sheet music websites. In this case, the musician may use a search engine and download sheet music file in Adobe PDF format to a personal computer. Additionally, the musician may obtain sheet music files from other musicians or by using a conventional document scanner. Such document scanners are often provided with software to render the scanned image into a PDF file format on a users computer. Once the sheet music files are available on a personal computer, the user may use a conventional USB cable to connect the personal computer to the electronic sheet music display device of this inventive disclosure. There are many ways to transfer sheet music files between the personal computer and the electronic music display. One method is to use the computer to computer file exchange over a serial connection capabilities of PC operating systems such as MS Windows (on the external connected personal computer or PC) and Windows CE (on the music display device), product names provided for an example. In one specific embodiment, file exchange between a personal computer and the electronic sheet music display is implemented by using the well known, Internet File Transfer Protocol (FTP) running over Point to Point protocol (PPP) on the USB serial connection. FTP and PPP as well as other Internet protocols are well known to those skilled in the art and will not be discussed in detail herein. FTP and PPP networking support components are usual components of the embeddable operating systems discussed above, including Linux. FTP provides error free file transfer capabilities, as well as remote directory listing capabilities and remote file deletion capabilities, these features all find service in the present invention as discussed in further detail both earlier and following paragraphs. With FTP, the FTP server executes on the electronic sheet music display computer, while the personal computer would utilize the FTP client provided with the PC operating system, or an application integrating FTP protocol. In yet another specific embodiment of the invention, more suitable to simpler custom written OS, and to provide another known enabling example, another way is to utilize common public domain code such as the KERMIT protocol, using a KERMIT protocol server on the single board computer in the music display device, and a KERMIT client on the person computer. This example provides high speed (over USB) binary data file transfer of sheet music files between the PC and the music display device. The KERMIT protocol provides the connected personal computer with the additional ability to do a directory of sheet music files on the music display device from the PC side of the connection, provides the ability to delete files on the music display device from the PC side of the connection, as well as to send files between the PC and the music display device. As mentioned, KERMIT protocol software is readily available, ready to use without modification, and known to those skilled in the art, and does not require an operating system supporting Internet Protocol networking. The use of KERMIT is discussed herein only to provide an additional enabling disclosure, and KERMIT is well know and readily available. Those skilled in the art will immediately recognize that other protocols can be applied to obtain error free binary sheet music file transfer over a USB cable between the user's PC and the electronic sheet music display device in a client server fashion without resort to FTP over PPP, or KERMIT. The intent of the disclosure does not depend on the communications protocol selected to achieve file transfer, as has been illustrated by example. Those skilled in the art will easily recognize that other error free client server protocols, either commercial or self-developed, can readily be used to achieve the file transfer without deviating from the disclosure of the present invention.

Once the sheet music is loaded to the electronic sheet music display device, the device is ready for use. As discussed in the Summary of the Disclosure, the device is equipped with a single board computer, running an embedded operating system or a custom developed OS. The single board computer can be custom developed independently, or in another embodiment can utilize an off the shelf readily available single board system as discussed in detail earlier. The single board computer directly provides interfaces to drive the LCD screen, RAM, ROM, flash memory interface for flash memory storage card using a flash file system, and other devices. The single board computer provides ample power off retentive memory to hold multiple electronic sheet music files, as well as menus and software to implement sheet music directory display on the sheet music display device.

The electronic music display device may readily be placed on a music stand or lyre. In one particular embodiment the electronic sheet music display is activated (powered on) by depressing both directional buttons (page forward and page backwards) simultaneously for a period of about 1 second. The user interacts with the device by use of the directional buttons (page forward and page backwards) and via a displayed menu bar. Once powered on, the user may activate the menu bar feature by depressing both directional buttons at about the speed of a mouse click. This action brings up the menu bar on the display. To make the menu bar a clear example for the reader, if you were to imagine looking at the typical personal computer application the menu bar might appear something like the following:

File Edit View Insert Format Tools . . . and so on.

To access, say the "Format" option to describe by example—Once the menu is displayed, the user selects the right arrow (page forward) until the menu option 'Format' is highlighted. Once there, in order to access the "Format" tree, the user depresses both directional buttons again. Now, instead of a Left/Right functionality, the user has an Up/Down functionality. Once the user locates the desired selection in the tree, the user depresses both directional buttons and the menu selection is entered. Using this technique the user may browse through sheet music files stored on the electronic sheet music display. One selected, the sheet music appears on the electronic graphics display.

Initially, the user can adjust the screen backlighting to suit ambient light and glare conditions. The score is read by the musician and played by the musician, using the foot switch to page forward to the next page, or alternately using the page forward, pack backward buttons on the face of the electronic music display. When the score is completed, the musician returns to the menu and selects another score to play, or perhaps decides to powers off the music display device. The menu additionally allows the musician to select between a shared use mode and a single musician mode. In the shared use mode, the left screen is detached along the separable hinge from the right screen then the left screen can then be shared with another musician. In this mode the left screen and right screen display the same music score page. In the single musician mode, the left screen displays odd number pages of the score and the right screen displays even number pages, this allows the musician to page forward to the next score page before the current music score page is completed. The new page does not replace the current displayed page, but displays instead on the other graphic display (rather than the graphic display having the current music score page). In this way, current music pages alternate between screens, and the musician is not distracted by a sudden screen update on the current music display screen being viewed. This is, in fact, another advantage over the current art. After use, the electronic sheet music display may be powered off by depressing both directional buttons for a period of about 3 seconds, after which the power indictor LED is extinguished and the device powers off.

This discussed sequence of operation is for one embodiment of the invention, but is in no way limiting to other embodiments. The operating modes may be change and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical, material, mechanical, software and electrical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable electronic sheet music display device, comprising:
   a folding sheet music display body, the body having a left half body and a right half body, each half body having a planar rectangular configuration, each half body having a front face, a rear face, and four sides;
   a separable hinge removably joining one side of the left half body to a similar side of the right half body such that the half bodies can be pivotally rotated about a hinge axis such that in a first open position the front faces share a coplanar relationship and in a second closed position the front faces share a facing distal coplanar relationship, the separable hinge permitting the left half body to be disengaged from and located remotely from the right half body;
   an electronic graphic display located on the front face of each half body for displaying an electronic sheet music score thereon, the graphic display having an illuminating means to enable viewing in low light conditions;
   a page forward selector located on the front face of the right half body;
   a page backward selector located on the front face of the left half body;
   a USB port located in the side of the right half body for receiving sheet music files from a personal computer;
   an electronic interconnect cable connecting the left half body to the right half body;
   a microprocessor based computer mounted within the right half body, the computer comprising:
      an operating system and operating programs in non volatile memory, the operating system providing device drivers and core operating system functions to support interfacing of the graphic displays, USB port, file system management and execution of stored programs to support the electronic sheet music display functionality; and
      microcomputer hardware interfaces to the graphics displays, selector inputs, foot switch, USB, and writtable non volatile memory for storage of sheet music files and settings;
   an internal battery for supplying electrical power to the sheet music display device;
   a power supply connection located in the side of the right half body for powering the sheet music display device and recharging the battery, said power supply connector sized and fitted to receive a conventional AC power adapter cable plug;
   a display illuminating means dimmer control located on a side of the right half body;
   a power on LED;
   a means for illuminating the page forward and page backward selectors;
   a solar cell array located in the front face of the left half body; and
   a solar cell array located in the front face of the right half body.

2. The sheet music display device of claim 1, further comprising:
   a foot switch connection port located on the side of the right half body; and
   a foot switch external to the sheet music display device, said foot switch connecting via an electronic cable to the foot switch connection port of the electronic sheet music display, said foot switch having an actuating switch surface integrated to mimic the page forward selector input when actuated.

3. The electronic sheet music display of claim 2 wherein the computer includes a music file maintenance protocol means implemented through the USB connection to a personal computer, the file maintenance protocol means comprising:
   a computer executed server means on the music display device, and a client means on the personal computer, said client server means providing an error free sheet music file transfer protocol;
   a directory function of stored music files on the sheet music display device, requested from and displayed to the personal computer;
   a file send function means, for sending a personal computer sheet music file to the electronic sheet music display device over the USB connection;
   a file fetch function means, for fetching a sheet music file from the electronic sheet music display device to the personal computer over the USB connection; and
   a file delete function, for deleting selected files from the sheet music display device via command from the personal computer over the USB connection.

4. The electronic sheet music display of claim 3 wherein the computer is a single board, low power computer having embedded operating system and interface devices provided thereon, and wherein the computer is designed for low power operation from a single voltage power supply, and wherein the computer providing power management functions incorporated therein.

5. The electronic sheet music display of claim 3 wherein the electronic graphic display is a transflective liquid crystal display, said transflective display to improve music score readability in strong illumination conditions and permit backlight in low light conditions, the electronic display further comprising:
   an anti-glare low reflective layer fixed to an outside face of the electronic graphic display, said layer to reduce glare and improve music score readability.

6. The electronic sheet music display of claim 5 wherein the electronic graphic display illuminating means comprises a light emitting diode illuminated backlight panel, the backlight panel in a facing coplanar relationship to a back face of the transflective display.

7. The electronic sheet music display of claim 3 wherein the electronic graphic display illuminating means comprises a cold cathode fluorescent illuminated frontlight panel in a facing coplanar relationship to a front face of the graphics display, and the electronic graphic display comprising a liquid crystal display having a reflective backing, the electronic display further comprising:

an anti-glare low layer fixed to an outside face of the frontlight panel, said layer to reduce glare and improve music score readability.

8. The electronic sheet music display of claim 5, further comprising:

a screen displayed menu system, displayable and concealable by use of the page forward and page backward selector buttons, said menu system providing a means for the user to select music scores for display from internal memory; and a selectable display mode comprising a shared musician mode and a single musician mode, said modes selected using said menu system.

9. The electronic sheet music display device of claim 8, wherein:

the menu interface is displayed via a brief simultaneous actuation of the page forward and page backward selectors;

the menu tree is navigated by use of the page forward and page backwards selectors; and menu items are selected by simultaneous actuation of the page forward and page backwards selectors.

10. The electronic sheet music display of claim 9, wherein the computer is a single board, low power computer having embedded operating system and interface devices provided thereon, and wherein the computer is designed for low power operation from a single voltage power supply, and wherein the computer providing power management functions incorporated therein.

11. The electronic music display device of claim 2 wherein the foot switch comprises a membrane switch for noise free actuation, so a not to disturb the musicians and the performance.

12. The electronic music display device of claim 10 wherein the foot switch comprises a membrane switch.

13. The sheet music display device of claim 1, further comprising:

a foot switch external to the sheet music display device, said foot switch comprising:

a membrane switch element form noise free actuation; and a short range wireless communications link between the electronic music display and the foot switch, eliminating the need for a cable from the foot switch to the sheet music display device.

* * * * *